(12) United States Patent
Barkan et al.

(10) Patent No.: US 8,856,396 B2
(45) Date of Patent: Oct. 7, 2014

(54) RECOGNITION TECHNIQUES TO ENHANCE AUTOMATION IN A COMPUTING ENVIRONMENT

(71) Applicant: International Business Machines Corporation, Armonk, NY (US)

(72) Inventors: Ella Barkan, Haifa (IL); Shay Ben-David, Haifa (IL); Amir Geva, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/058,248

(22) Filed: Oct. 20, 2013

(65) Prior Publication Data

US 2014/0101660 A1   Apr. 10, 2014

Related U.S. Application Data

(63) Continuation of application No. 13/110,943, filed on May 19, 2011, now Pat. No. 8,601,172.

(51) Int. Cl.
| | | |
|---|---|---|
| *G06F 3/00* | (2006.01) | |
| *G06F 17/00* | (2006.01) | |
| *G06F 9/46* | (2006.01) | |
| *G06F 9/44* | (2006.01) | |
| *G06N 5/04* | (2006.01) | |
| *G06F 3/048* | (2013.01) | |
| *H04L 29/06* | (2006.01) | |
| *G06F 3/01* | (2006.01) | |

(52) U.S. Cl.
CPC .............. *G06F 9/466* (2013.01); *G06F 9/4443* (2013.01); *G06N 5/04* (2013.01); *G06F 3/048* (2013.01); *H04L 29/06163* (2013.01); *G06F 3/016* (2013.01)

USPC ............................... 710/15; 706/11; 715/700

(58) Field of Classification Search
None
See application file for complete search history.

(56) References Cited

U.S. PATENT DOCUMENTS

| | | | |
|---|---|---|---|
| 2002/0029259 A1* | 3/2002 | Okada | 709/219 |
| 2005/0132342 A1 | 6/2005 | Lunteren | |
| 2007/0124146 A1 | 5/2007 | Lunteren | |

OTHER PUBLICATIONS

J. van Lunteren et al. "XML accelerator engine", First International Workshop on High Performance XML Processing, in conjunction with the 13th International World Wide Web Conference (WWW2004), New York, N.Y., USA, May 2004. URL: http://www.research.ibm.com/XML/IBM_Zurich_XML_Accelerator_Engine_paper_2004May04.pdf.

Jan van Lunteren "High-Performance Pattern-Matching for Intrusion Detection" Proceedings of IEEE Infocom'06, Barcelona, Spain, Apr. 2006.

Davide Pasetto et al., "Tools for Very Fast Regular Expression Matching", IEEE Computer, Mar. 2010.

* cited by examiner

*Primary Examiner* — Alan Chen
(74) *Attorney, Agent, or Firm* — Derrick J. Carman; Jason H. Sosa; Eyal Gilboa (57) ABSTRACT

Systems and methods for detecting end of a transaction in a computing environment are provided. The method comprises determining a target area in a graphical user environment displayed on a display screen, wherein a change is expected to occur when end of a transaction is reached; masking the target area at least partially to remove content included in the target area that is present before or after the transaction was initiated; monitoring the target area for change in content; and detecting the end of the transaction when the content of the target area has changed.

20 Claims, 9 Drawing Sheets

```
OPER ACTION ==>  |                WORK FUNCTION MENU         X$00     2010/11/25
TEST                                                                  02:00:12

01 ADJUSTMENTS              09 INVESTIGATION MEMOS       RATES
02 ADMINISTRATION           10 GOOD MORNING REPORTS      SERVICE LINE
   AUDITING                 11 INQUIRIES                 SECURITY ADMIN
04 CASH                     12 METER READINGS            TAX
   CASH MANAGEMENT          13 NEWS ITEM INQUIRY         21 METER INFORMATION
                            14 ORDER EXECUTES
07 CONTROL TABLES           15 ORDER SCHEDULING          23 DIS SUPPORT
08 QUALITY OF SERVICE       16 ORDER TAKES               24 NEW SERVICES

PF1-HELP       CLEAR-LOGOFF

```
OPER ACTION ==>              WORK FUNCTION MENU        X$00     2010/11/25
TEST                                                            02:00:12

01 ADJUSTMENTS              09 INVESTIGATION MEMOS     RATES
02 ADMINISTRATION           10 GOOD MORNING REPORTS    SERVICE LINE
   AUDITING                 11 INQUIRIES               SECURITY ADMIN
04 CASH                     12 METER READINGS          TAX
   CASH MANAGEMENT          13 NEWS ITEM INQUIRY       21 METER INFORMATION
                            14 ORDER EXECUTES
07 CONTROL TABLES           15 ORDER SCHEDULING        23 DIS SUPPORT
08 QUALITY OF SERVICE       16 ORDER TAKES             24 NEW SERVICES

```
OPER ACTION ==>                WORK FUNCTION MENU      X$00    2010/11/25
TEST                                                           02:00:12

01 ADJUSTMENTS          09 INVESTIGATION MEMOS    RATES

02 ADMINISTRATION       10 GOOD MORNING REPORTS   SERVICE LINE

AUDITING             11 INQUIRIES              SECURITY ADMIN

04 CASH                 12 METER READINGS         TAX

CASH MANAGEMENT      13 NEWS ITEM INQUIRY      21 METER INFORMATION

14 ORDER EXECUTES

07 CONTROL TABLES       15 ORDER SCHEDULING       23 DIS SUPPORT

08 QUALITY OF SERVICE   16 ORDER TAKES            24 NEW SERVICES

PF1-HELP    CLEA

```
OPER ACTION ==>                                                    2011/02/07
TEST              WORK FUNCTION MENU        X$00       01:56:25

01 ADJUSTMENTS         09 INVESTIGATION MEMOS     RATES

02 ADMINISTRATION      10 GOOD MORNING REPORTS    SERVICE LINE

AUDITING            11 INQUIRIES               SECURITY ADMIN

04 CASH                12 METER READINGS          TAX

CASH MANAGEMENT     13 NEWS ITEM INQUIRY       21 METER INFORMATION

14 ORDER EXECUTES

07 CONTROL TABLES      15 ORDER SCHEDULING        23 DIS SUPPORT

08 QUALITY OF SERVICE  16 ORDER TAKES             24 NEW SERVICES

PF1-HELP    CLEAR-LOGOFF

RECOGNITION TECHNIQUES TO ENHANCE AUTOMATION IN A COMPUTING ENVIRONMENT

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to automation in a computing environment and, more particularly, to a system and method for implementing recognition techniques to detect the end of a transaction in order to automate a sequence of transactions on a computing system.

BACKGROUND

In computing systems, the advancement of a program from one stage to the next often depends on the direct interaction of a user with the system at different stages. For example, the system may automatically perform one or more transactions at a first stage. Once the transactions are completed, then a user may need to review the results and interact with the system to initiate the next stage, by providing additional input (e.g., pressing a key on the keyboard).

If the length of time associated with the computations involved in the series of transactions is undesirably long, then a user will have to either wait until the end of the transactions is reached or alternatively move on to another program. Fortunately, automation programs are available that can be used to ease the burden on the user by automatically detecting the end of a transaction and advancing the system to the next stage. The interactions are usually repeating tasks, which can be performed with more accuracy and efficiency via automation.

Usually, an automation framework is configured to generate a predetermined sequence of user interface events (e.g., keyboard/mouse input) once the end of a computing transaction is detected, so that the system can move on to the next stage. In addition the automation framework needs to harvest information from various stages. However, determining the end of a computing transaction can be difficult depending on the nature of the transaction, the underlying system design or the configuration of the computing program.

Particularly, detecting the end of a transaction in a graphical user environment may be very difficult when working through a visual interface that only allows sampling activity on the display screen, in contrast to environments where detecting the end of transaction may be accomplished by checking the value of a variable. For example, in an environment where HTML content is received from a HTTP server, detection of the end of a transaction may be simply determined by checking the value of a flag that provides the receipt status of the content requested. In such environments, monitoring the exact appearance of various content on the display screen is not necessary for detecting the end of a transaction.

Current approaches for detecting an end of transaction include monitoring screen refresh events and updates or waiting until a certain time period passes without any updates being detected. Presence of animation or blinking characters on the screen typically prevents the screen from settling, however. As such, if the end of a transaction is not followed by a quiet period when the screen is not refreshed, the end of transaction may not be easily detected by the automation framework.

Other methods have been proposed that involve screen capture, optical character recognition (OCR) of screen content, and relatively sophisticated hashing algorithms or synchronization hooks that need to be included in program code. These methods, however, typically require the advance knowledge of the exact or the entire content of the screen to be successful.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for detecting end of a transaction in a computing environment is provided. The method comprises determining a target area in a graphical user environment displayed on a display screen, wherein a change is expected to occur when end of a transaction is reached; masking the target area at least partially to remove content included in the target area that is present before or after the transaction was initiated; monitoring the target area for change in content; and detecting the end of the transaction when the content of the target area has changed.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, recognition techniques are utilized to detect the end of transaction in a computing environment in order to automate a sequence of transactions, so that a user would not have to manually monitor or initiate each transaction. Depending on implementation and particular automation scenario or system configuration, one or more of the following exemplary methods may be utilized to detect the end of a transaction.

In one example, prior knowledge of the underlying program or application may be used to monitor certain regions of the display screen that have the property of changing when a target transaction ends. In one implementation, the automation framework tracks any changes to the target regions. When a screen update event produces a change that matches a predetermined criteria (e.g., appearance or disappearance of a character), the end of transaction may be detected.

In another example, the automation framework may monitor one or more display areas to determine the presence of a cursor or other graphical user interface (GUI) object that is known to appear on a certain portion of the screen, in response to the occurrence of a certain event. For example, the end of a transaction may be detected if pressing the spacebar a certain number of times may result in the cursor appearing at a certain point from the top left corner of the screen.

Depending on implementation, other potential keys may be utilized to achieve similar results. For example, pressing the caps lock key may result in the appearance of a character (e.g., a capital letter "A") at a certain known location on the display. Or, pressing the shift, num lock or scroll lock keys may be used to force the appearance of a known character on a known location on the display screen, where it can be detected as a means to determine that the end of a transaction has been reached.

In yet another example, the automation framework may monitor any portion of the display by way of using a screen capture in combination with OCR at predetermined time intervals or in response to occurrence of a certain event. Using screen capture and OCR (and optionally a hash algorithm) the end of a transaction may be detected if a known symbol, character, icon or otherwise graphical feature is presented on any point on the screen or a particular point on the screen.

It is noteworthy that the above methods take into account that certain display artifacts or program features may result in the screen being continuously refreshed (e.g., the cursor may continue to flash or an animated feature may be present on the screen). In such a scenario the automation framework does not rely or wait for a quiet display state to detect an end of transaction. Instead one or more of the above-noted methods may be used to detect the end of a transaction.

As provided in further detail below a machine learning technique may be also employed to help the automation framework learn how specific criteria may be used to determine the end of a transaction. For example, if at the end of a particular transaction a certain logo or special content is always displayed on a certain part of the screen, then machine learning scheme may be used to detect such content or scenarios and determine that the end of a transaction is reached.

One would appreciate that many different examples and scenarios are possible within the context of the subject matter disclosed here. It is thus noted that the scenarios suggested here are provided by way of example to help better identify some of the details associated with implementing the embodiments disclosed here. Such details should not be construed as limiting the scope of the claimed subject matter to the particular features, however.

Referring to FIGS. 1A to 1C and FIG. 2, in one embodiment the knowledge of presence of certain text or GUI objects on a particular portion of the display may be used to detect the end of a transaction, regardless of whether the screen continues to refresh. As shown in the example screenshot in FIG. 1A, the area designated by the oval-shaped indicator at the bottom of the screen may be dedicated to displaying instructional text that would appear or refresh when the end of a transaction is reached.

Figure 1A:
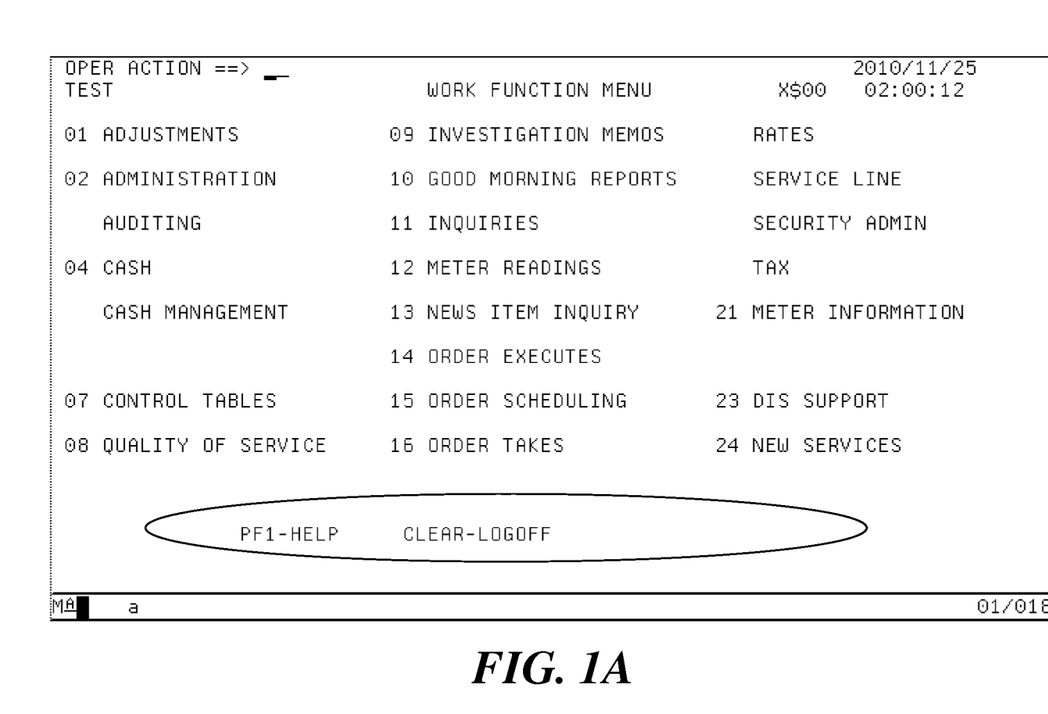
FIGS. 1A to 1C are exemplary screenshots in which the end of a transaction is detected, in accordance with one embodiment.
Figure 2:
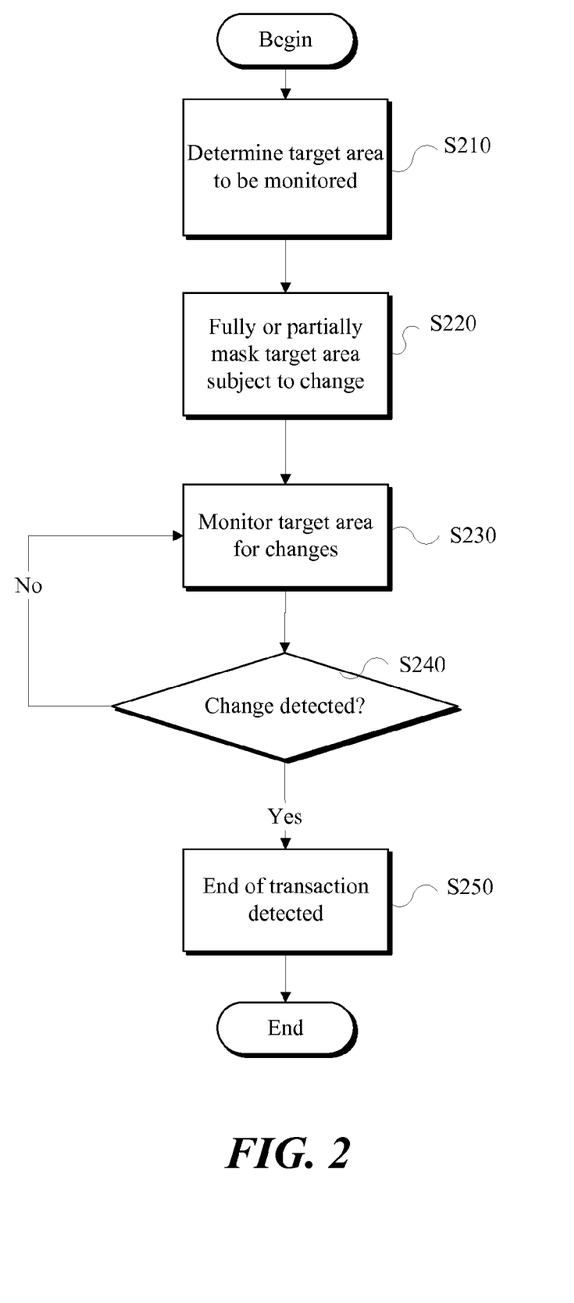
FIG. 2 is a flow diagram of an exemplary method for detecting the end of a transaction in accordance with one embodiment.

As shown in the example of FIG. 1A, "PF1—HELP" and "CLEAR—LOGOFF" are displayed in the lower area of the display screen to indicate that, for example, pressing the F1 key will result in a help screen appearing, or that pressing the CLEAR key on the keyboard would result in logging off of the currently running program. Referring to FIG. 2, the noted portion of the display screen may be determined as a target area to be monitored (S210).

Figure 1B:
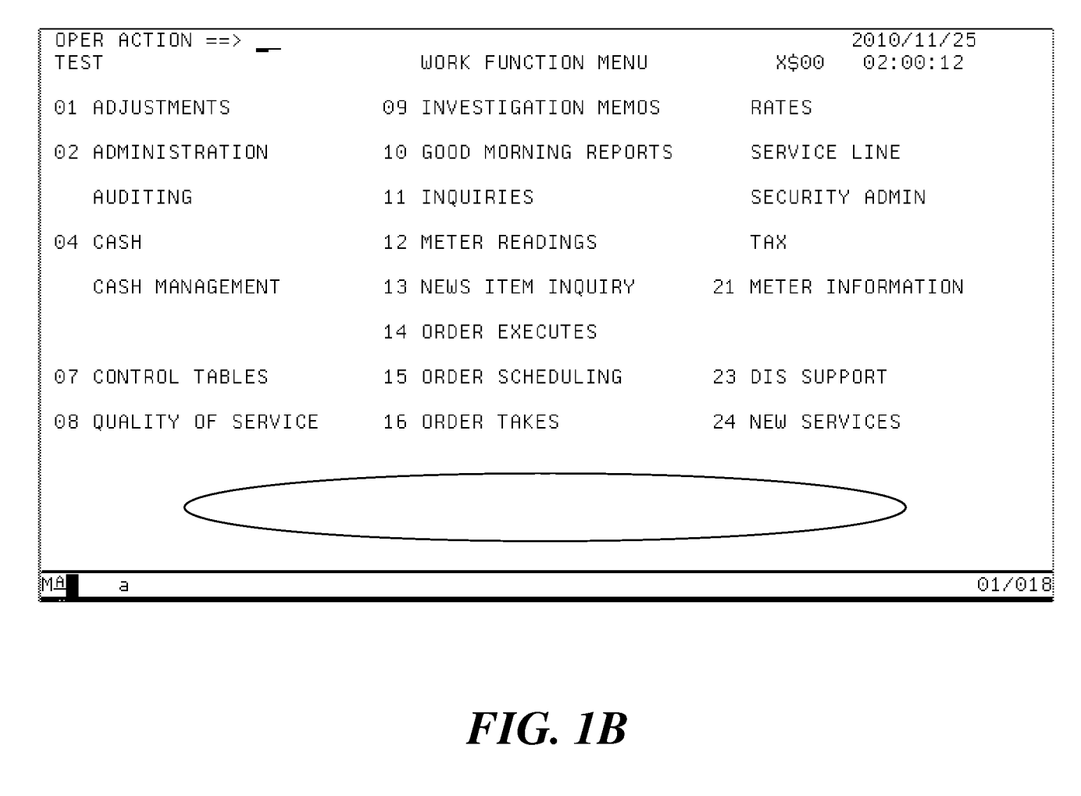

Relying on the information that is known about the underlying system and the nature of the GUI displayed when a certain program is executed, it may be determined that the content included in the target area is refreshed when the end of the transaction is reached. To be able to determine whether the content is refreshed, in one embodiment, the content of the target area is fully or partially masked (S220) as shown in FIG. 1B, so that the content that were displayed in that area prior to or after the start of the transaction are no longer visible.

Depending on implementation, a full or partial snapshot of the display screen, after the masking has been applied, may be taken as a baseline screenshot, so that the baseline screenshot may be later compared to another screenshot. The comparison will help determine if the content of the target area has changed. Accordingly, while the transaction is in progress the target area is monitored (S230). The monitoring may include taking additional screenshots at predetermined time intervals or in response to detecting the occurrence of certain events, for example.

When comparing the additional screenshots with the baseline screenshot, the automation framework may determine a change in the target area (S240). For example, if the instructional content reappears on the lower portion of the display screen, either fully or partially (see FIG. 1C) that may indicate that the end of the transaction has been reached (S250).

Figure 1C:
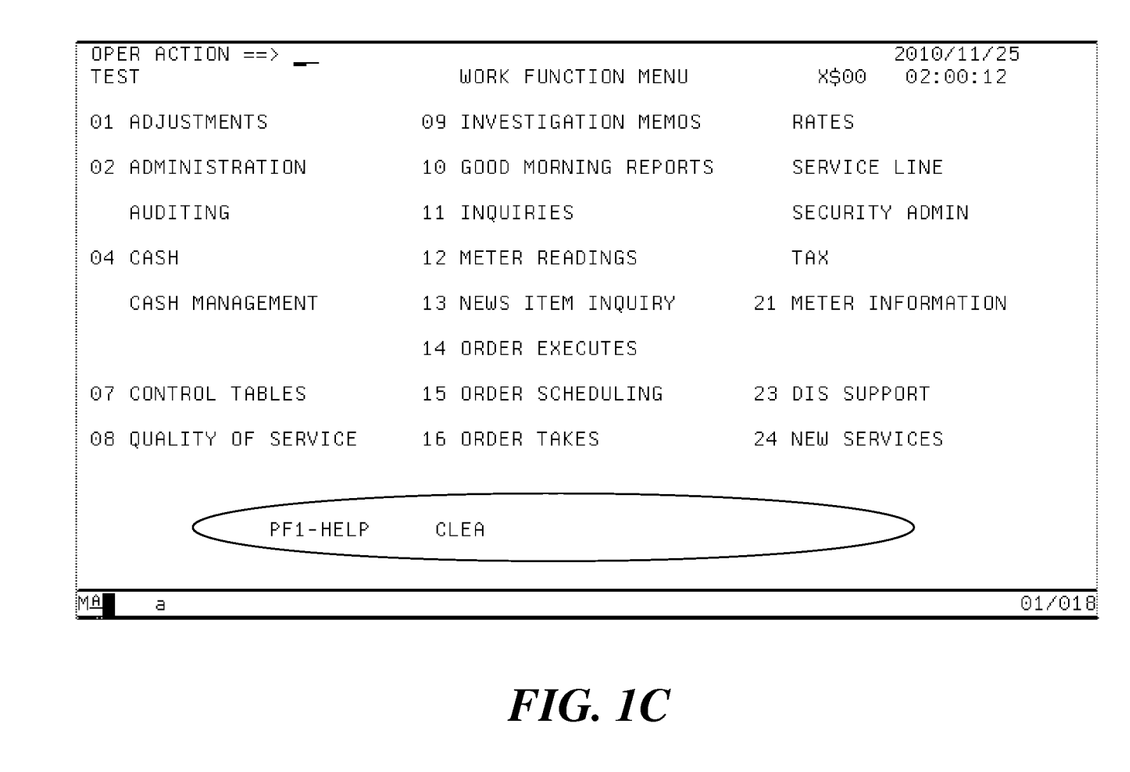

In other words, while the transaction is in progress, the content of the display screen (or a target area on the display) may not be refreshed. Once the transaction is completed, then the display is refreshed and the instructional content (e.g., "PF1-HELP" and "CLEAR-LOGOFF") reappear in the target area. As shown in FIG. 1C, even a partial display of content in the target area may be sufficient to detect the end of transaction in certain embodiments.

A similar approach may be utilized in another example, where a certain area of the display may be designated as a target area and monitored for the appearance or disappearance of a known content to determine whether the end of a transaction is reached. Referring back to FIG. 1A, for example, note that the lower portion of the screen in which a horizontal border is displayed includes a lower case letter "a" on the left and a set of numbers on the right.

In one implementation, having the benefit of the knowledge that pressing the caps lock key, for example, will result in the displaying of a capital letter "A" in the horizontal border, a target area may be set to monitor changes to the content displayed in the horizontal border. Note that when the transaction is in progress, issuing a caps lock event will not result in the display of the capital letter "A" in the lower horizontal border. The capital letter "A" will appear, however, after the end of the transaction is reached.

Figure 3:
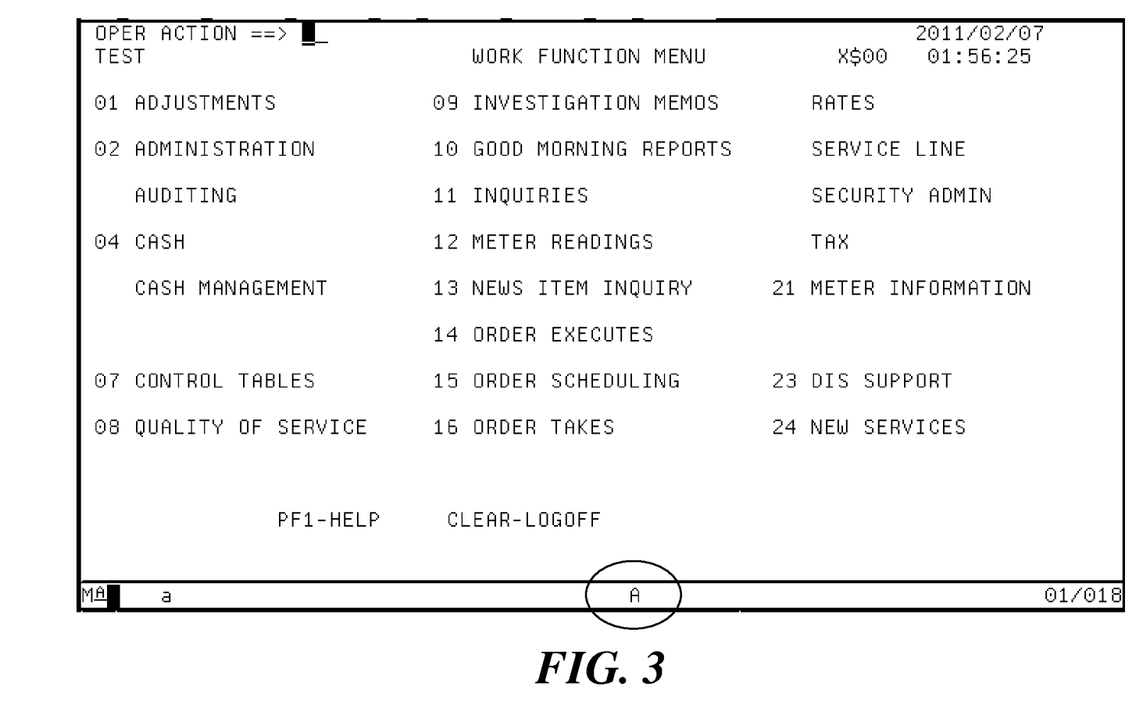
FIGS. 3, 4A and 4B are other exemplary screenshots in which the end of a transaction is detected in accordance with one or more embodiments.

Accordingly, in the exemplary screenshot illustrated in FIG. 3, the appearance of the capital letter "A" is an indication that the end of transaction is reached. Thus, configuring the automation framework to issue a caps lock event and to continue to monitor the lower horizontal border for the appearance of the letter "A" as shown in FIG. 3 would make it possible to detect the end of transaction as soon the transaction has completed.

In some embodiment, the disappearance of certain content from an area of the display may be an indication of the end of transaction. For example, in certain applications, an icon such as a lightning bolt, a sand hour glass, rotating clock handles, or other animated features may be displayed on the screen to indicate that a transaction is in process. In one implementation, the automation framework may be configured to detect the disappearance of such features from the screen and thereby identifying the end of a transaction.

It is noteworthy that in the above implementations, certain exemplary features, options or embodiments were discussed which are to be construed as non-limiting examples. One of ordinary skill would appreciate that in alternative embodiments the concepts disclosed above may be adapted or altered depending on the underlying nature of the automation framework or the transaction environment without detracting from the scope of the claimed subject matter.

Figure 4A:
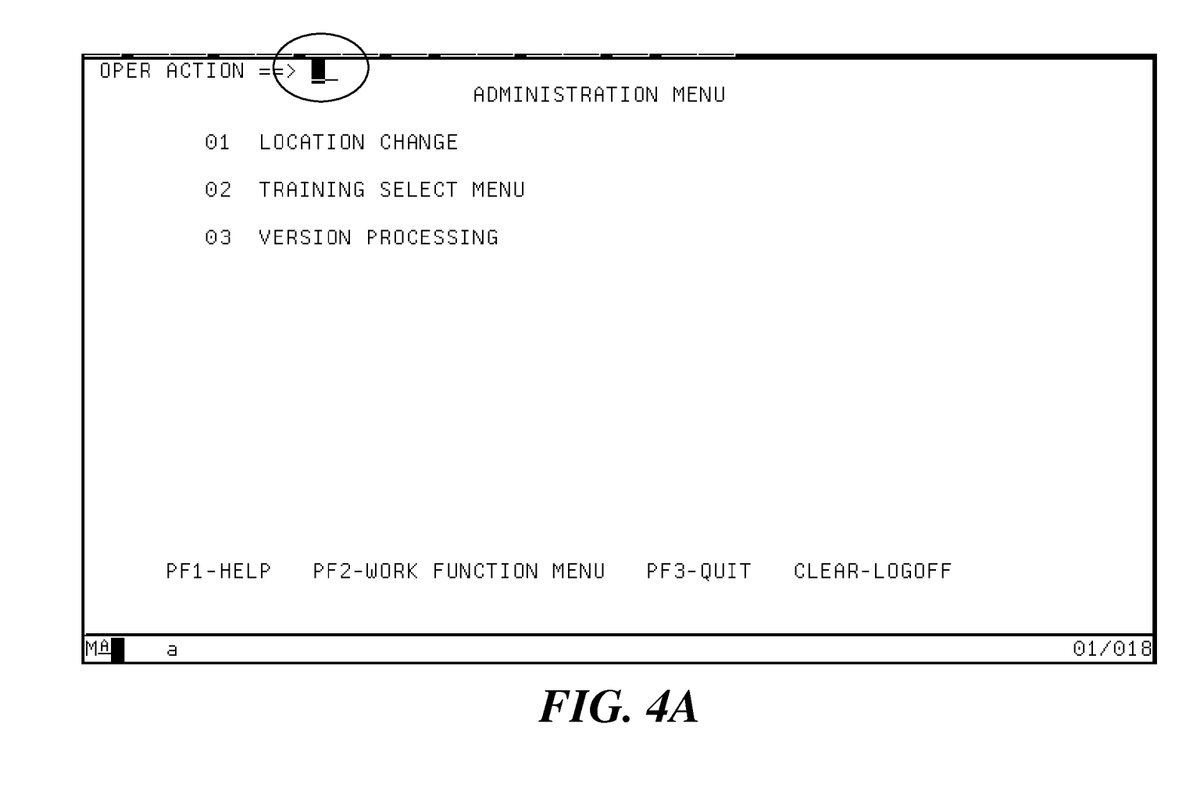
Figure 4B:
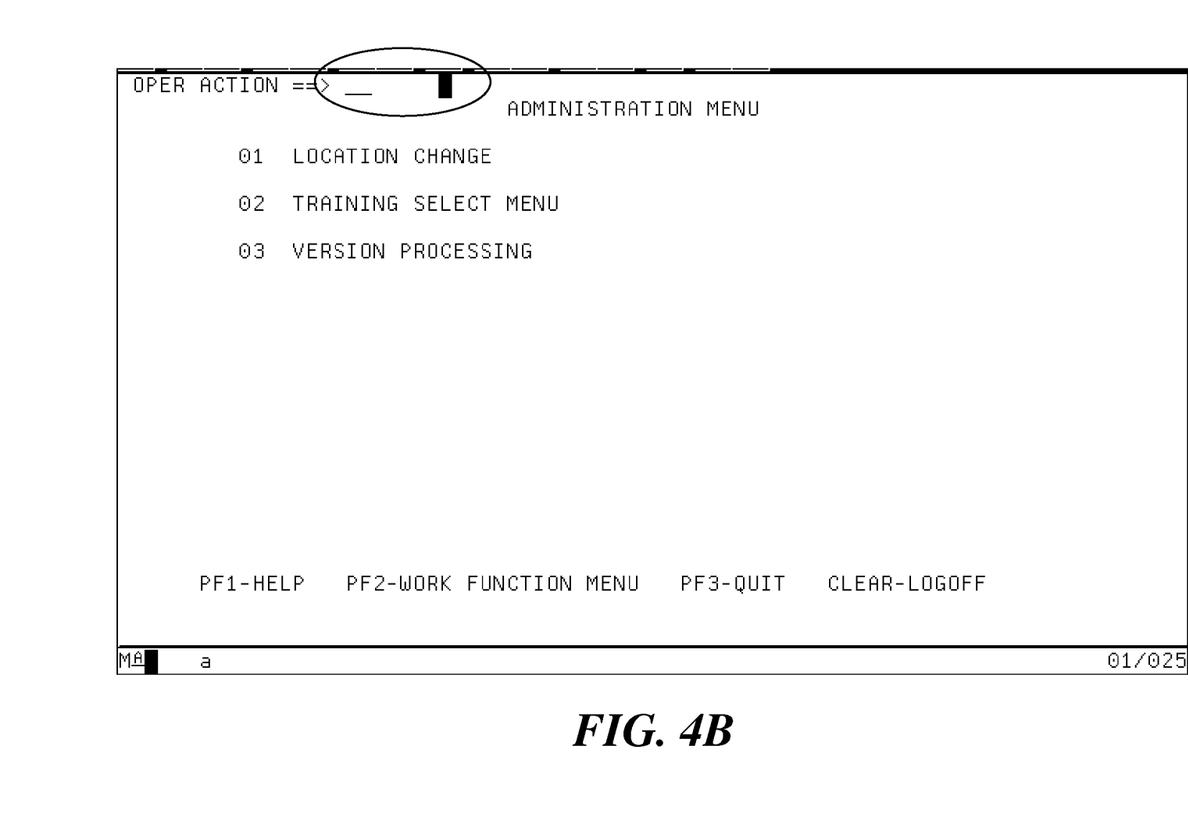

Referring to FIGS. 4A and 4B, the appearance or disappearance or movement of a cursor may be monitored to determine the end of a transaction. For example, the black square cursor indicated by a circle on top of FIG. 4A may be present and flashing before a transaction is started, during the transaction and after the transaction has ended. In other words, the location of the cursor does not change before or after the transaction is completed.

In one embodiment, once the transaction starts, the automation framework may generate an event (e.g., one or more key strokes) that would result in the position of the cursor changing once the transaction has completed. For example, as designated in the oval-shaped indicator of FIG. 4B, the black cursor has moved several spaces to the right in comparison to the positioning shown in FIG. 4A. Detecting such change in position of the cursor may be used in one or more embodiments to determine the end of transaction.

Alternatively an opposite approach may be utilized to force a change in the location of the cursor, before the transaction starts. Then the cursor location is monitored and if a change in the location of the cursor is detected i.e., if the position of the cursor goes back to the location at the beginning of the line, then it is determined that the transaction is completed.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5A:
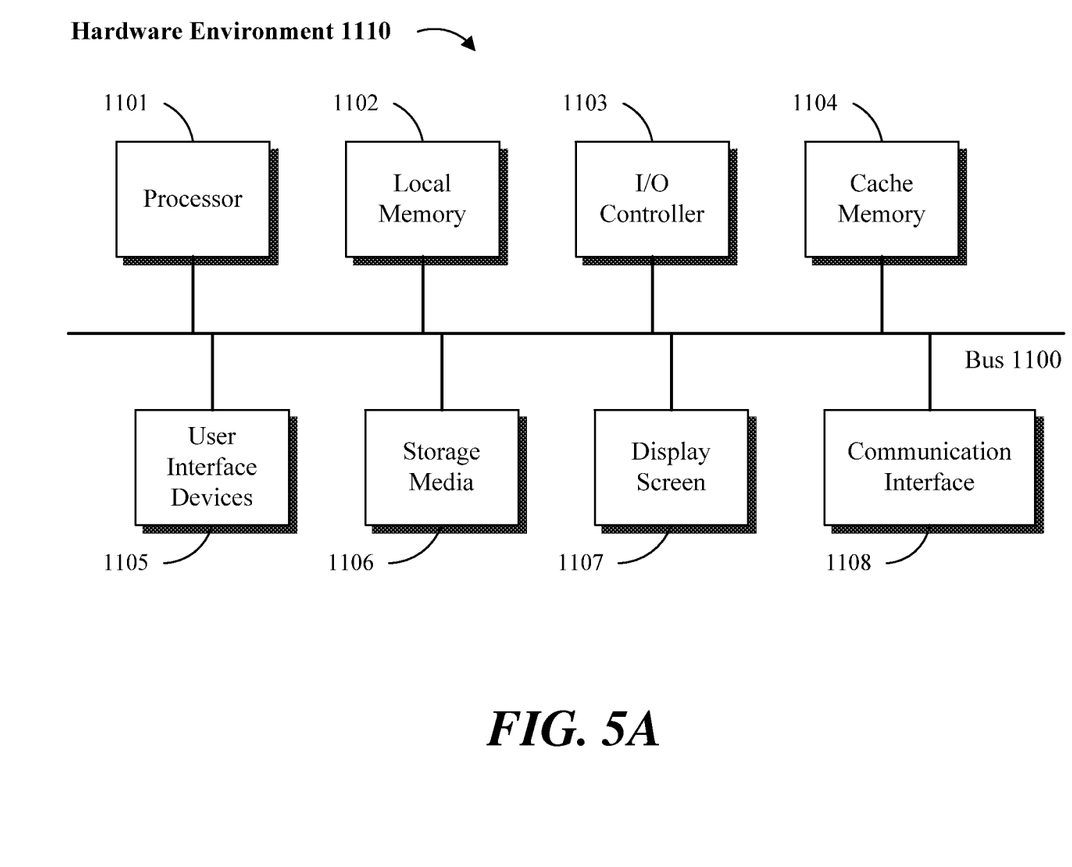
FIGS. 5A and 5B are block diagrams of hardware and software environments in which the disclosed systems and methods may operate, in accordance with one or more embodiments.
Figure 5B:
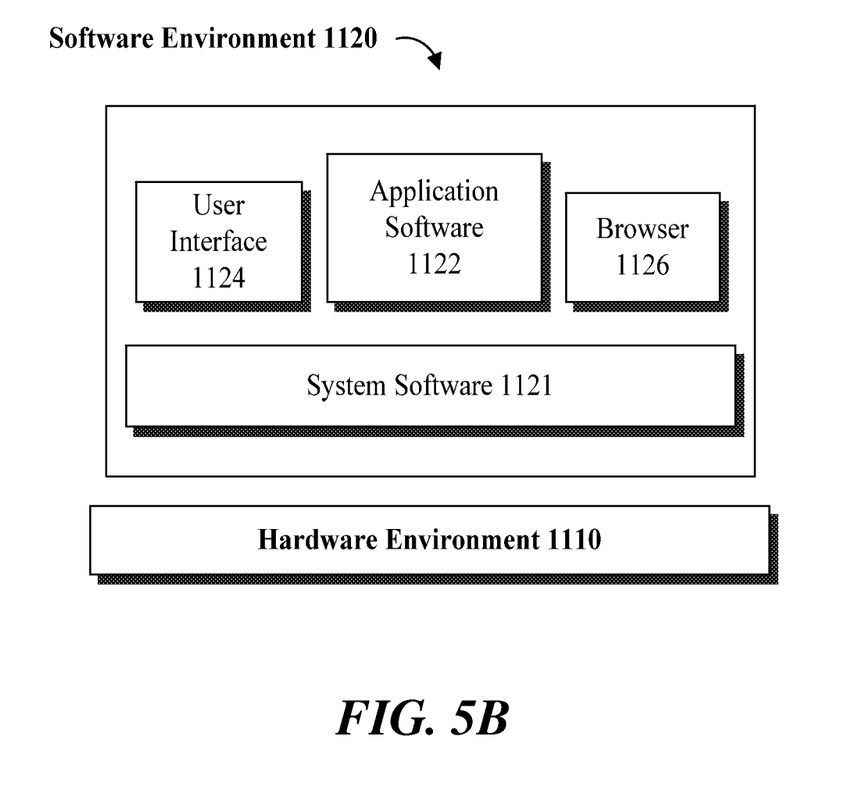

Referring to FIGS. 5A and 5B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 5A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for detecting end of a transaction in a computing environment, the method comprising:
   determining a target area in a graphical user environment displayed on a display screen, wherein a change is expected to occur when end of a transaction is reached, wherein a first state and a second state of at least one graphical feature in the target area are determinable in advance, wherein the first state is associated with a time prior to the end of the transaction and the second state is associated with a time after the end of the transaction;
   masking the target area at least partially to remove content included in the target area that is present before or after the transaction was initiated;
   monitoring the target area for change in content; and
   detecting the end of the transaction based on an analysis of the content of the target area, wherein the analysis indicates that characteristics of content included in the target area match the second state of the at least one graphical feature.

2. The method of claim 1, wherein the monitoring comprises:
   maintaining a baseline screenshot of the target area before the transaction has completed and comparing the baseline screenshot with additional screenshots taken subsequent to the transaction starting; and
   determining that the end of the transaction is reached when the content in one of the additional screenshots taken is different than the content in the baseline screenshot.

3. The method of claim 1, further comprising performing optical character recognition (OCR) to help determine if the content of the target area has changed.

4. The method of claim 1, wherein it is determined that the content of the target area has changed, in response to determining that position or nature of a first feature in said target area has changed.

5. The method of claim 1, wherein a machine learning process is applied to determine the nature of change in the target area.

6. The method of claim 1, wherein the change in the target area is a direct result of the end of the transaction being reached.

7. The method of claim 1, wherein the change in the target area is a result of initiation of one or more events while the transaction is in progress.

8. The method of claim 7, wherein the initiation of one or more events while the transaction is in progress results in one or more changes appearing in the target area after the transaction is completed.

9. The method of claim 1, wherein the content of the target area is determined to be changed if a graphical feature appears in the target area after the end of the transaction is reached.

10. The method of claim 1, wherein the content of the target area is determined to be changed if a graphical feature disappears from or changes position in the target area, after the end of the transaction is reached.

11. A system comprising one or more processors executing program code for detecting end of a transaction in a computing environment, the system comprising:
    a logic unit for determining a target area in a graphical user environment displayed on a display screen, wherein a change is expected to occur when end of a transaction is reached, wherein a first state and a second state of at least one graphical feature in the target area are determinable in advance, wherein the first state is associated with a time prior to the end of the transaction and the second state is associated with a time after the end of the transaction;

a logic unit for masking the target area at least partially to remove content included in the target area that is present before or after the transaction was initiated;

a logic unit for monitoring the target area for change in content; and a logic unit for detecting the end of the transaction based on an analysis of the content of the target area, wherein the analysis indicates that characteristics of content included in the target area match the second state of the at least one graphical feature.

12. The system of claim 11, further comprising:

a logic unit for maintaining a baseline screenshot of the target area before the transaction has completed and comparing the baseline screenshot with additional screenshots taken subsequent to the transaction starting; and a logic unit for determining that the end of the transaction is reached when the content in one of the additional screenshots taken is different than the content in the baseline screenshot.

13. The system of claim 11, further comprising a logic unit for performing optical character recognition (OCR) to help determine if the content of the target area has changed.

14. The system of claim 11, wherein it is determined that the content of the target area has changed, in response to determining that position or nature of a first feature in said target area has changed.

15. The system of claim 11, wherein a machine learning process is applied to determine the nature of change in the target area.

16. The system of claim 11, wherein the change in the target area is a direct result of the end of the transaction being reached.

17. The system of claim 11, wherein the change in the target area is a result of initiation of one or more events while the transaction is in progress.

18. A computer program product comprising a non-transient computer readable storage medium having a computer readable program, wherein the computer readable program when executed on a computer causes the computer to:

determine a target area in a graphical user environment displayed on a display screen, wherein a change is expected to occur when end of a transaction is reached, wherein a first state and a second state of at least one graphical feature in the target area are determinable in advance, wherein the first state is associated with a time prior to the end of the transaction and the second state is associated with a time after the end of the transaction;

mask the target area at least partially to remove content included in the target area that is present before or after the transaction was initiated;

monitor the target area for change in content; and detecting the end of the transaction when the content of the target area has changed based on an analysis of the content of the target area, wherein the analysis indicates that characteristics of content included in the target area match the second state of the at least one graphical feature.

19. The computer program product of claim 18, wherein the computer readable program when executed on a computer further causes the computer to:

maintain a baseline screenshot of the target area before the transaction has completed and comparing the baseline screenshot with additional screenshots taken subsequent to the transaction starting; and determine that the end of the transaction is reached when the content in one of the additional screenshots taken is different than the content in the baseline screenshot.

20. The computer program product of claim 18, wherein the computer readable program when executed on a computer further causes the computer to perform optical character recognition (OCR) to help determine if the content of the target area has changed.

* * * * *